United States Patent [19]

Sato

[11] Patent Number: 4,570,596
[45] Date of Patent: Feb. 18, 1986

[54] IGNITION TIMING CONTROL APPARATUS FOR INTERNAL COMBUSTION ENGINE

[75] Inventor: Kunihiko Sato, Okazaki, Japan

[73] Assignee: Toyota Jidosha Kabushiki Kaisha, Japan

[21] Appl. No.: 687,262

[22] Filed: Dec. 28, 1984

[30] Foreign Application Priority Data

Mar. 26, 1984 [JP] Japan .................................. 59-56155

[51] Int. Cl.[4] ................................................ F02P 5/15
[52] U.S. Cl. ..................................... 123/421; 123/424
[58] Field of Search ................................ 123/424, 421

[56] References Cited

U.S. PATENT DOCUMENTS

4,351,297  9/1982  Suematsu ............................. 123/424
4,421,085 12/1983  Nagase et al. ....................... 123/421
4,489,691 12/1984  Ono et al. ............................ 123/424

Primary Examiner—Andrew M. Dolinar
Attorney, Agent, or Firm—Finnegan, Henderson, Farabow, Garrett & Dunner

[57] ABSTRACT

The time when the startup of an engine is completed is detected. In accordance with the coolant temperature of the engine directly after the completion of startup, a correction coefficient is first determined, and thereafter, is gradually attenuated. The ignition timing of the engine is corrected depending upon the correction coefficient.

8 Claims, 10 Drawing Figures

IGNITION TIMING CONTROL APPARATUS FOR INTERNAL COMBUSTION ENGINE

BACKGROUND OF THE INVENTION

1. Field of the Invention

The present invention relates to an ignition timing control apparatus of an internal combustion engine, more particularly to an ignition timing control apparatus for improving driving characteristics directly after engine startup.

2. Description of the Related Art

In a spark ignition type internal combustion engine, generally in the state where the temperature of the coolant is low or in the state directly after startup where the temperature of the combustion chamber is extremely low, the aeration of the fuel deteriorates and also the combustion speed slows down, resulting in unstable combustion. This results in such disadvantages as unstableness of the idling speed and inferior driving characteristics.

To eliminate such disadvantages, control has conventionally been effected to increase the amount of fuel supplied while the coolant temperature is low or directly after startup, to make the ignition timing more advanced in angle while the coolant temperature is low, etc. However, such methods of control have not been able to achieve fully satisfactory driving characteristics directly after startup when the combustion chamber is coldest. If it is attempted to increase by a massive amount the amount of fuel supplied directly after startup so as to improve the driving characteristics, the ignition plugs are liable to become sooty. Further, if the percent of change of the advance angle correction to the change of the coolant temperature is uniformly increased, knocking is liable to occur. This is because the coolant temperature does not represent the temperature of the combustion chamber of the engine. For example, even when the coolant temperature is 0° C., the combustion chamber temperature differs in the case when starting from −30° C. and rising to 0° C. and the case when starting from 0° C. In other words, in the latter case, the temperature of the combustion chamber is low. Therefore, in the latter case, the ignition timing is too far in advance of the desired value and knocking is liable to occur.

SUMMARY OF THE INVENTION

It is, therefore, an object of the present invention to improve the driving characteristics and improve the stability of the idling speed directly after engine startup.

According to the present invention the above object is achieved by an apparatus which comprises means for detecting the driving state of an engine; means for finding a basic ignition timing according to the detected driving state, means for detecting the temperature of the coolant of the engine, means for finding a first advance angle correction coefficient corresponding to the detected coolant temperature, means for detecting the time when the startup of the engine is completed, means for finding a second advance angle correction coefficient corresponding to the detected coolant temperature directly after the completion of startup, means for gradually attenuating the second advance angle correction coefficient to zero, means for correcting the advance angle of the basic ignition timing according to the first and second advance angle correction coefficients, and means for adjusting the actual ignition timing of the engine according to the ignition timing after advance angle correction.

BRIEF DESCRIPTION OF THE DRAWINGS

FIGS. 2, 2A and 2B are a block diagram showing the constitution of the ECU of FIG. 1;

DESCRIPTION OF THE PREFERRED EMBODIMENTS

Figure 1:
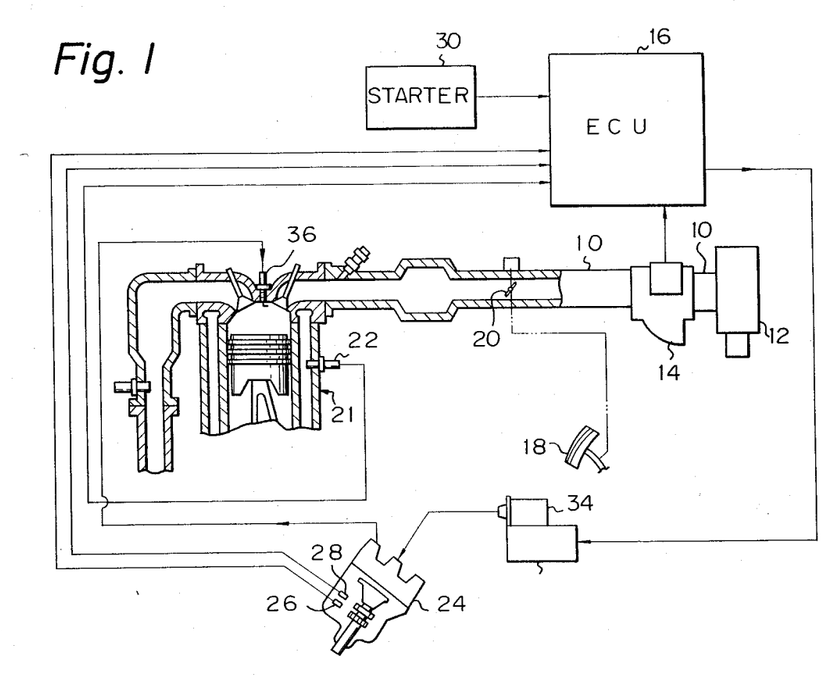
FIG. 1 is a schematic view of an embodiment of the present invention.

FIG. 1 schematically shows, as an embodiment of the present invention, an internal combustion engine in which a microcomputer controls the ignition timing. In the figure, reference numeral 10 represents an intake passageway communicated to an air cleaner 12, and 14 an air flow sensor provided in the middle of the intake passageway 10. The air flow sensor 14 detects the amount of flow of intake air of the engine and outputs a voltage corresponding to the detected value. This output voltage is supplied to an electronic control unit (ECU) 16. The intake passageway 10 downstream of the air flow sensor 14 is provided with a throttle valve 20 linked with an accelerator pedal 18 and controlling the amount of flow of intake air.

A cylinder block 21 of the engine is mounted with a water temperature sensor 22 for detecting the temperature of the coolant. The water temperature sensor 22 outputs a voltage corresponding to the detected value, the output voltage being supplied to the ECU 16.

A distributor 24 is mounted with clutch angle sensors 26 and 28. These crank angle sensors 26 and 28 output crank angle pulse signals at each 30° and 180° revolution, respectively, of the engine. These pulse signals are supplied to the ECU 16, and are used for forming the top dead center position signal and other various timing signals. Further, the 30° crank angle pulse signal is used for determining the speed NE of the engine.

A starter 30 supplies a starter signal indicating whether or not the starter motor is being driven, i.e., whether startup is in process, to the ECU 16.

The ECU 16 sends an ignition timing to an igniter 32, whereby the primary current of an ignition coil 34 is intermittently controlled. This results in the flow of a high voltage current to the ignition plugs 36 of each cylinder via the distributor 24, causing ignition sparks to be generated at the timings indicated by the ignition signals.

Figure 2A:
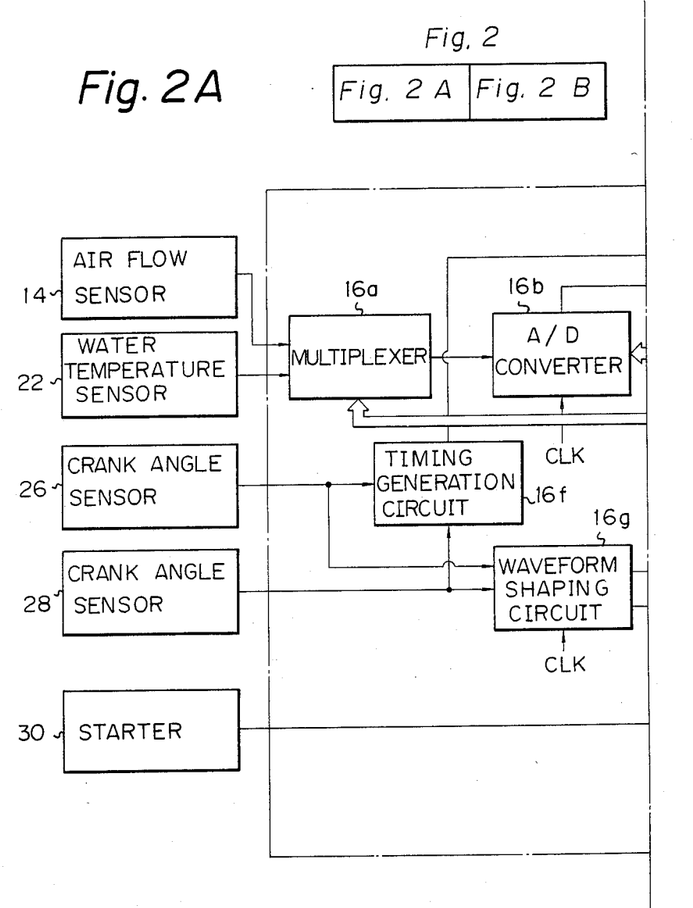
Figure 2B:
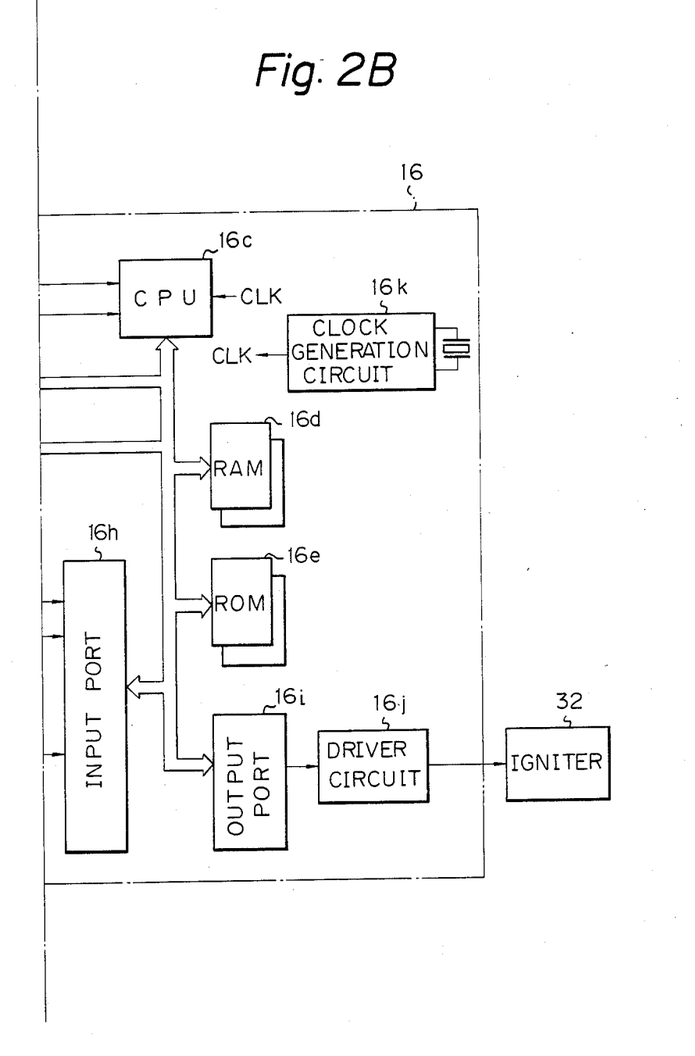

FIG. 2 is a block diagram showing in detail the ECU 16 of FIG. 1. The output voltages of the air flow sensor 14 and the water temperature sensor 22 are sent to a multiprocessor 16a. The multiprocessor 16a acts upon the instructions given from a central processing unit (CPU) 16c to select the output voltage of either the air flow sensor 14 or the water temperature sensor 22 and sends the that voltage to an analog-to-digital (A/D) converter 16b. The A/D converter 16b converts the selected output voltage to a digital signal and requests accessing processing to the CPU 16c after completion of the conversion. This accessing processing to the CPU 16c after the completion of A/D conversion causes the A/D converted input data to be stored in predetermined addresses in the respective random access memories (RAM) 16d.

The 30° crank angle pulse signal from the crank angle sensor 26 is supplied to a timing generation circuit 16f and, upon an accessing processing request signal, each 30° crank angle is supplied through a waveform shaping circuit 16g to an input port 16h. During the accessing processing routine for each 30° clutch angle, a search is made to determine the engine speed NE. This can be easily executed by determining the difference between the contents of the free run counter during the prior accessing processing and the current accessing processing. The data of the determined speed NE is stored in predetermined positions in the RAM 16d. The 180° crank angle pulse signal from the crank angle sensor 28 is supplied to the timing generation circuit 16f and the waveform shaping circuit 16g for use in the formation of the signal indicating the top dead center position and the signal for deciding which cylinder is to be ignited. The starter signal from the starter 30 is input through the input port 16 directly to a microcomputer. The ignition signal indicating the timing for the start of overcharging to the ignition coil 34 and the ignition timing is output from the CPU 16c to the predetermined bit position of the output port 16i and is output through the drive circuit 16j to the igniter 32.

The microcomputer, in addition to the above-mentioned constituent elements, includes a read only memory (ROM) 16e and a clock generation circuit 16k. A later-mentioned control program and function table, etc., are stored in advance in the ROM 16e.

Next, an explanation will be given of the operation of the microcomputer of the present embodiment using the control program shown in FIG. 3 and FIG. 5.

Figure 3:
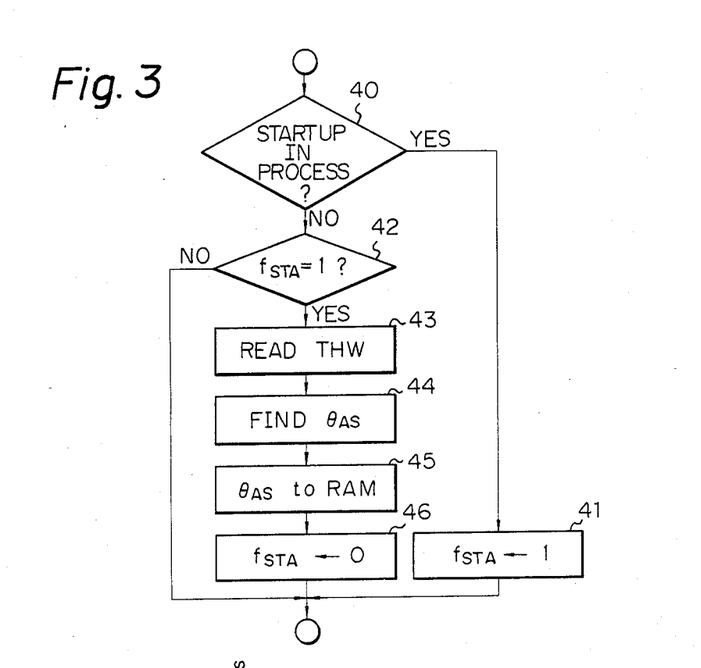
FIG. 3 is a flowchart of part of the control program of the ECU.

During the main routine, the CPU 16c executes the processing shown in FIG. 3. This processing routine is carried out to determine the post-startup advance angle correction coefficient used in the processing routine of FIG. 5, especially its initial value. First, at step 40, the CPU 16c judges whether the engine is currently in the process of startup. As the judgement method, a starter signal is input from the starter 30 to judge whether the starter is currently being driven or whether the speed NE at this time is a predetermined speed or less, far lower than idling, for example, 400 rpm or less.

In the case of startup, the routine procedes to step 41, where the flag $f_{STA}$ is set to "1". At step 40, if judgement is made that startup is not in process, the routine advances to step 42, where judgement is made whether the flag $f_{STA}$ is "1". Only where $f_{STA}=1$, is the processing of steps 43 to 46 executed. The flag $f_{STA}$ is set to "0" at step 46, therefore if the processing of steps 43 to 46 is performed once, it is not performed again. In other words, the processing of steps 43 to 46 is executed only one time after the completion of startup.

Figure 4:
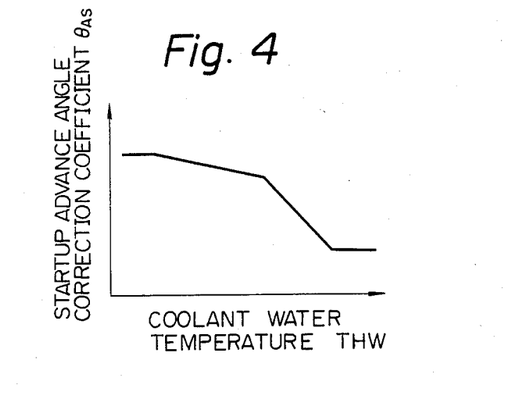
FIG. 4 is a graph showing $\theta_{AS}$ against THW.

At step 43, input data on the coolant temperature THW alpha is read from the predetermined position of the RAM 16d. Next, at step 44, the post-startup advance angle correction coefficient $\theta_{AS}$ corresponding to the coolant temperature THW is sought. A function table of $\theta$ againt THW is stored in advance in the ROM 16e, as shown in FIG. 4. At step 44, this function table and the interpolation method are used to find the $\theta_{AS}$ for the THW. At the next step 45, the $\theta_{AS}$ thus determined is stored at a predetermined position in the RAM 16d. At step 46, as described above, the flag $f_{STA}$ is reset to "0". In this way, by the processing routine of FIG. 3, the post-startup advance angle correction coefficient $\theta_{AS}$ corresponding to the coolant temperature THW can be determined only once directly after startup.

Figure 5:
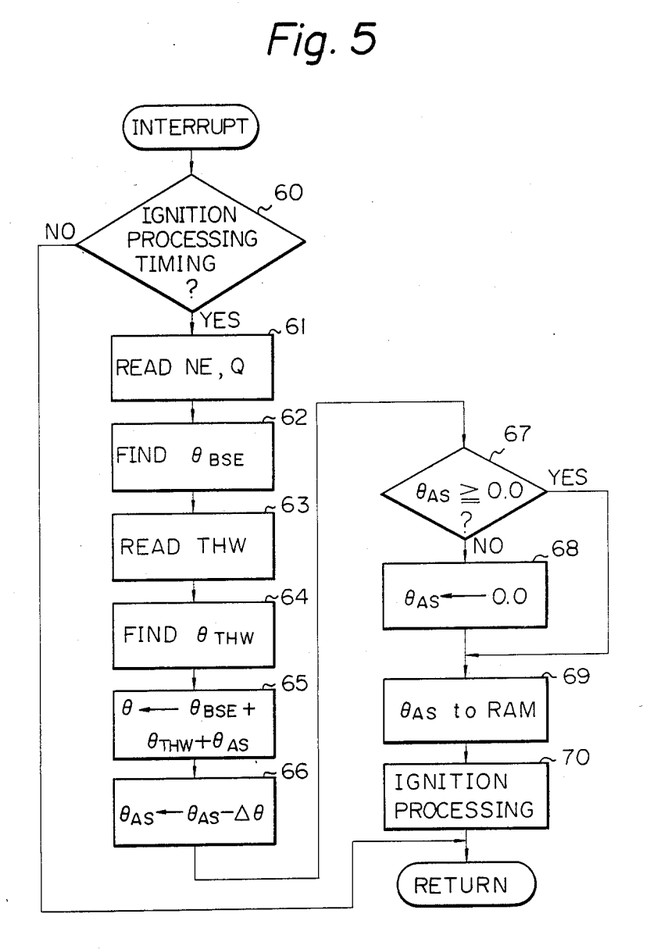
FIG. 5 is a flowchart of part of the control program of the ECU.

On the other hand, the CPU 16c executes the accessing processing shown in FIG. 5 every predetermined time or every predetermined crank angle. This processing routine is for calculating the ignition timing and the ignition processing. First, at step 60, judgement is made as to whether it is the timing for the ignition processing. When it is not the timing for the ignition processing, the following processing is completely omitted, the accessing processing is completed, and returned to the main table. When it is the timing for the ignition processing of the cylinders, at the next step 61, the input data on the engine speed NE and the amount of flow of intake air Q are read from the predetermined positions in the RAM 16d. Next, at step 62, the basic ignition advance angle $\theta_{BSE}$ corresponding to the speed NE and the amount of flow of intake air Q is determined. A function table of $\theta_{BSE}$ against Q/NE and NE, is stored in advance in the ROM 16e as shown below:

| 1.0 | 5 | 8 | — | 15 | — | 20 | 20 | ... | 30 |
|---|---|---|---|---|---|---|---|---|---|
| 0.9 | 5 | — | — | — | — | — | — | ... | — |
| 0.8 | 5 | — | — | — | 20 | — | 25 | ... | — |
| 0.7 | — | — | — | — | — | — | — | ... | — |
| 0.6 | 10 | — | 30 | — | 30 | — | 35 | ... | 30 |
| 0.5 | — | — | — | — | — | — | — | ... | — |
| 0.4 | — | — | — | — | — | — | — | ... | — |
| 0.3 | 20 | — | 35 | — | 40 | — | 50 | ... | 40 |
| Q/NE NE | 800 rpm | 1200 | 1600 | 2000 | 2400 | 2800 | 3200 | ... | 5000 |

Figure 6:
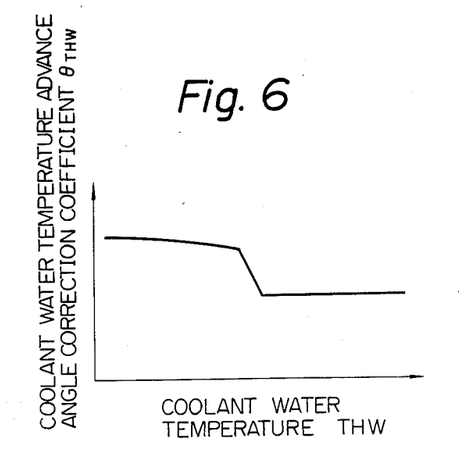
FIG. 6 is a graph showing $\theta_{THW}$ against THW.

At step 62, the above function table and the interpolation method is used to find the basic ignition advance angle $\theta_{BSE}$ for NE and Q. At the next step 63, the input data of the coolant temperature THW is read from the RAM 16d. At step 64, the coolant temperature advance angle correction coefficient $\theta_{THW}$ corresponding to the THW is sought. A function table of the $\theta_{THW}$ against THW is stored in advance in the ROM 16e, as shown in FIG. 6. At step 64, the interpolation method is used to find the $\theta_{THW}$ for the THW from this function table.

At the next step 65, the basic ignition advance angle $\theta_{BSE}$ and the coolant water temperature advance angle correction coefficient $\theta_{THW}$ found at steps 62 and 64 and the post-startup advance angle correction coefficient $\theta_{AS}$ stored in the RAM 16d are used to calculate the final ignition advance angle $\theta$ by $\theta = \theta_{BSE} + \theta_{THW} + \theta_{AS}$. At the next step 66, since the post-startup advance angle correction coefficient $\theta_{AS}$ is supposed to be gradually attenuated after startup, at step 66, $\theta$ is reduced by exactly the attenuation value delta $\theta$. Each time the processing routine of FIG. 5 is repeated, it is reduced by delta $\theta$ at step 66, so that $\theta_{AS}$ is gradually attenuated. If the processing routine of FIG. 5 is an accessing processing routine for each predetermined time, $\theta_{AS}$ is attenuated corresponding to the time elapsed after startup, while if it is an accessing processing routine for each predetermined crank angle, $\theta_{AS}$ is attenuated in accordance with the overall rotational angle of the engine after startup.

Figure 7:
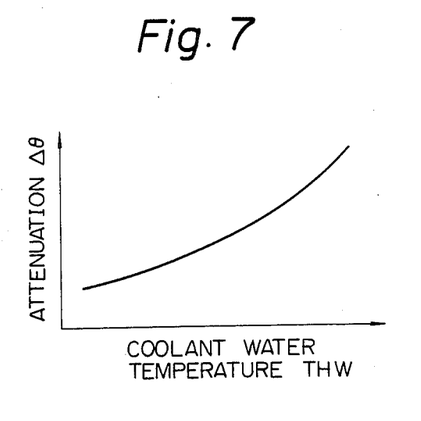
FIG. 7 is a graph showing delta $\theta$ against THW.

The attenuation value dalta $\theta$ may be a fixed value determined in advance or may be a variable value. In the former case, the attenuation speed becomes fixed. In the latter case, the delta $\theta$ may be made to change in accordance with the coolant temperature THW. In this case, at step 64, both $\theta_{THW}$ and delta $\theta$ are determined in accordance with THW. In other words, the ROM 16e is provided in advance with a function table for delta $\theta$ against THW, as shown in FIG. 7. This function table and the interpolation method are used for determining the delta $\theta$ corresponding to the THW.

At steps 67 and 68 after the completion of the processing of step 66, processing is effected so that $\theta_{AS}$ does not fall under 0.0. In other words, when not $\theta_{AS} \geq 0.0$, the processing of $\theta_{AS} < 0.0$ is performed at step 68. Therefore, $\theta_{AS}$ is gradually attenuated until reaching zero and remains at zero. Next, at step 69, $\theta_{AS}$ is stored in a predetermined position of the RAM 16d. At the next step 70, the ignition signal is determined from the final ignition advance angle $\theta$, as above, and this is sent to the output port 16i by a well-known ignition processing.

Figure 8:
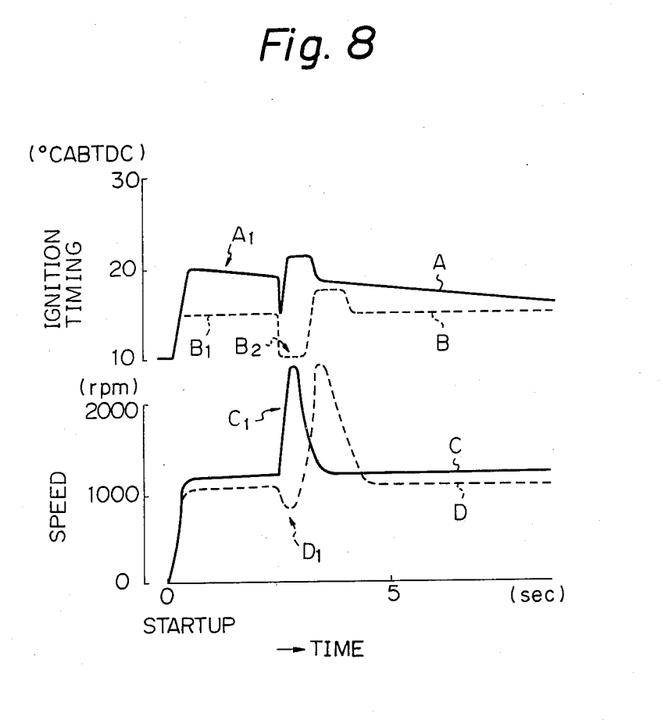
FIG. 8 is a view explaining the advantageous effects of the present invention.

FIG. 8 is a view explaining the advantageous effects of the present invention and shows the ignition timing when the engine is raced directly after startup and the changes against time of the speed. In the figure, solid lines A and C show the ignition timing and speed according to the present invention, while broken lines B and D show the ignition timing and speed according to the prior art, where no correction by a post-startup advance angle correction coefficient $\theta_{AS}$ is performed.

In general, when the throttle is fully opened by racing the engine directly after startup, the ignition timing is controlled in the delay direction for full throttle opening (WOT), and when the speed rises, is controlled in the advance angle direction. If the engine is so raced when the combustion chamber is cold, the fuel during full throttle opening adheres to the pipe walls of the intake passageway and the gas mixture actually used for the combustion becomes considerably lean and the combustion speed slows down. Consequently, if the ignition timing directly after startup slows down as shown by B$_1$, as in the prior art, the time of the slowed down ignition timing for WOT becomes longer, as shown by B$_2$ and, during that time, a decline in speed occurs as shown by D$_1$. These characteristics are not preferable for good driving. Conversely, if the advance angle of the ignition timing is corrected as shown by A$_1$ only directly after startup in accordance with the coolant water temperature at that time, as in the present invention, the peak of combustion can be controlled to the optimal position. As a result, the speed rises rapidly without delay as shown by C$_1$ and driving characteristics with a good response can be obtained.

According to the present invention, not only the response during racing the engine directly after startup, but also the idling speed directly after startup can be stabilized.

As explained in detail above, according to the present invention, the ignition timing is corrected in the advance angle direction in accordance with the coolant water temperature only directly after startup, therefore it is possible to stabilize the idling speed directly after startup and to improve the driving characteristics directly after startup, such as the response to racing the engine directly after startup.

Many widely different embodiments of the present invention may be constructed without departing from the spirit and scope of the present invention. It should be understood that the present invention is not limited to the specific embodiments described in this specification, except as defined in the appended claims.

I claim:

1. An ignition timing control apparatus for an internal combustion engine comprising:
    means for detecting the operating state of the engine;
    means for finding a basic ignition timing in accordance with the detected operating state;
    means for detecting the temperature of the coolant of the engine;
    means for finding a first advance angle correction coefficient corresponding to the detected coolant temperature;
    means for detecting the timing when the startup of the engine is completed;
    means for finding a second advance angle correction coefficient corresponding to said detected coolant temperature directly after the completion of startup;
    means for gradually attenuating said second advance angle correction coefficient to zero;
    means for correcting said basic ignition timing in accordance with said first and second advance angle correction coefficients; and
    means for adjusting the actual ignition timing of the engine in accordance with said corrected ignition timing.

2. An ignition timing control apparatus according to claim 1, wherein said means for finding a second advance correction coefficient includes means for obtaining a second advance correction coefficient which is larger when the detected coolant water temperature is low than when it is high.

3. An ignition timing control apparatus according to claim 2, wherein said correction means includes means for correcting the ignition timing in a more advanced direction when the second advance correction coefficient is large than when it is small.

4. An ignition timing control apparatus according to claim 1, wherein said attenuation means includes means for gradually attenuating said second advance correction coefficient in accordance with the time elapsed from the completion of the startup.

5. An ignition timing control apparatus according to claim 1, wherein said attenuation means includes means for gradually attenuating said second advance correction coefficient in accordance with the overall rotational angle of the engine from the completion of the startup.

6. An ignition timing control apparatus according to claim 1, wherein said attenuation means includes means for attenuating said second advance correction coefficient by a fixed attenuation speed.

7. An ignition timing control apparatus according to claim 1, wherein said attenuation means includes means for attenuating said second advance correction coefficient by a variable attenuation speed.

8. An ignition timing control apparatus according to claim 7, wherein said attenuation means includes means for attenuating said second advance correction coefficient by an attenuation speed which varies in accordance with the detected coolant water temperature.

* * * * *